(12) United States Patent
Kaga et al.

(10) Patent No.: US 7,483,201 B2
(45) Date of Patent: Jan. 27, 2009

(54) PARTICLES FOR DISPLAY MEDIA, INFORMATION DISPLAY PANEL AND INFORMATION DISPLAY DEVICE, UTILIZING THE PARTICLES FOR DISPLAY MEDIA

(75) Inventors: Norihiko Kaga, Kodaira (JP); Toshiaki Arai, Funabashi (JP)

(73) Assignee: Bridgestone Corporation, Tokyo (JP)

( * ) Notice: Subject to any disclaimer, the term of this patent is extended or adjusted under 35 U.S.C. 154(b) by 60 days.

(21) Appl. No.: 11/547,962

(22) PCT Filed: Mar. 29, 2005

(86) PCT No.: PCT/JP2005/005902

§ 371 (c)(1),
(2), (4) Date: Oct. 10, 2006

(87) PCT Pub. No.: WO2005/098525

PCT Pub. Date: Oct. 20, 2005

(65) Prior Publication Data

US 2007/0211018 A1     Sep. 13, 2007

(30) Foreign Application Priority Data

Oct. 19, 2004 (JP) ............................. 2004-304186
Apr. 9, 1920 (JP) ............................. 2004-115235

(51) Int. Cl.
*G02B 26/00* (2006.01)
*G02F 1/03* (2006.01)

(52) U.S. Cl. ....................................... 359/296; 359/245
(58) Field of Classification Search .................. 359/296
See application file for complete search history.

(56) References Cited

U.S. PATENT DOCUMENTS

| | | | |
|---|---|---|---|
| 6,693,621 B1* | 2/2004 | Hayakawa et al. | 345/107 |
| 2001/0005567 A1* | 6/2001 | Harada et al. | 430/32 |
| 2004/0150325 A1* | 8/2004 | Yamakita et al. | 313/498 |

FOREIGN PATENT DOCUMENTS

| | | |
|---|---|---|
| EP | 0709713 A2 | 1/1996 |
| JP | 8-137416 A | 5/1996 |
| JP | 2000-35768 A | 2/2000 |
| JP | 2002-72256 A | 3/2002 |
| JP | 2002-236300 A | 8/2002 |
| WO | WO 03/027764 A1 | 4/2003 |

* cited by examiner

*Primary Examiner*—Jordan M. Schwartz
*Assistant Examiner*—James C Jones
(74) *Attorney, Agent, or Firm*—Sughrue Mion, PLLC (57) ABSTRACT

Particles for display media used for an information display device, wherein the display media are sealed between two opposed substrates, at least one of which is transparent and wherein the display media, to which an electrostatic field is applied, are made to move so as to display information such as an image or the like, having compound particles of mother particles and child particles, which are embedded in the surface layer of the mother particles and whose surfaces are exposed. Consequently, particles for display media, which are used for an information display device, wherein child particles are not dissociated under a reverse durability test, where rewriting is repeated, and primary performance can be maintained during the reverse durability test are provided. An information display panel and an information display device using the particles for display media are also provided.

5 Claims, 8 Drawing Sheets

PARTICLES FOR DISPLAY MEDIA, INFORMATION DISPLAY PANEL AND INFORMATION DISPLAY DEVICE, UTILIZING THE PARTICLES FOR DISPLAY MEDIA

TECHNICAL FIELD

The present invention relates to particles for display media used for an information display device, wherein the display media are sealed between two opposed substrates, at least one of which is transparent, and wherein the display media, to which an electrostatic field is applied, are made to move so as to display information such as an image or the like. The present invention also relates to an information display panel and an information display device utilizing the particles for the display media.

BACKGROUND ART

As an information display device substitutable for liquid crystal display (LCD), information display devices with the use of technology such as an electrophoresis method, an electro-chromic method, a thermal method, dichroic-particles-rotary method have been proposed.

These conventional techniques are considered to be useful for inexpensive visual display devices of the next generation compared with a LCD due to merits such as wider field of vision close to normal printed matter, smaller power consumption or a memory function, and expected to be spread out to information displays for portable devices, electronic paper and the like. Recently, electrophoresis method for microencapsulating dispersion liquid made up with dispersion particles and coloration solution and disposing the liquid between opposed substrates, is proposed and expected.

However, in the electrophoresis method, there is a problem that a response rate is slow by the reason of viscosity resistance because the particles migrate among the electrophoresis solution. Further, there is a problem of lacking imaging repetition stability, because particles with high specific gravity of titanium oxide is scattered within solution of low specific gravity and it is difficult to maintain a stability of dispersion state. Even in the case of microencapsulating, the cell size is diminished to a microcapsule level in order to make it hard to show the above-mentioned drawbacks, however, an essential problem is not overcome at all.

Besides the electrophoresis method using behavior in the solution, recently, a method that electro-conductive particles and a charge transport layer are installed in a part of the substrate without using solution has been proposed. [The Imaging Society of Japan "Japan Hardcopy '99" (Jul. 21-23, 1999) Transaction Pages 249-252] However, the structure becomes complicated because the charge transport layer and further a charge generation layer are to be arranged. In addition, it is difficult to constantly charge the electro-conductive particles, and thus there is a drawback on the lack of stability.

As one method for overcoming the various problems mentioned above, an information display device is known, wherein the display media are sealed between two opposed substrates, at least one of which is transparent, and wherein the display media, to which an electrostatic field is applied, are made to move so as to display information such as an image or the like.

The particles used for the above information display device need to have fluidity and controllability of charge capacity. Apart from the present invention, there is a known technique that the fluidity is improved and the charge capacity can be controlled by means of attaching the child (minor) particles (extra additive agents such as titania or fumed silica fine particles) to the mother (major) particle. However, when the electrophotographic toner such as the above-mentioned toner extra additive agent attaching type is used as the display media for the above-mentioned information display device, the child particles (extra additive agents) are easily dissociated from the surface of the mother particle, or the child particles are completely embedded into the mother particle due to thermal and mechanical stress arising in a reverse durability test of repeating the reverse of the information display. Thus, there was a problem that the primary performance cannot be maintained during a reverse durability test.

DISCLOSURE OF INVENTION

An object of the present invention is to eliminate the drawbacks mentioned above, to provide particles for display media, which are used for an information display device, wherein child particles are not dissociated under a reverse durability test and primary performance can be maintained during the reverse durability test, and also to provide an information display panel and an information display device using the particles for display media.

The particles for display media according to the present invention are used for an information display device, wherein the display media are sealed between two opposed substrates, at least one of which is transparent, and wherein the display media, to which an electrostatic field is applied, are made to move so as to display information such as an image or the like, and have compound particles of mother particles and child particles, which are embedded in the surface layer of the mother particles and whose surfaces are exposed.

In addition, as a preferred embodiment of the particles for display media according to the present invention, a particle diameter of a mother particle $d_0$ and a particle diameter of a child particle $d_{1-n}$ are provided with $0.01<d_0<50$ (μm), $0.01<d_{1-n}<1.00$ (μm) and $d_{1-n}/d_0<0.33$ respectively, and the average embedding rate W defined below is provided with $0.05<W<0.95$; $W=1-((S-S_0\phi_0)/\Sigma S_n\phi_n)$, wherein S is the superficial area of a compound particle per unit volume, $S_0$ is the superficial area of a mother particle per unit volume and $S_n$ is the superficial area of a child particle per unit volume. When n kinds of child particles are embedded, the particle dimensions of every child particle $d_{1-n}$ ($d_1, d_2, \ldots, d_n$) meet said relational expression.

When liquid powders mentioned later are utilized as the display media used in the information display panel according to the present invention, it is characterized in that the above-mentioned particles for display media are used as particle materials constituting the liquid powders. In addition, the information display panel according to the present invention is characterized in that above-mentioned particles for display media are used as the display media or the above-mentioned particles for display media are prepared to be liquid powders and used. Furthermore, the information display device according to the present invention is characterized in that it has the above-mentioned information display panel.

According to the present invention, compound particles of mother particles and child particles, which are embedded in the surface layer of the mother particles and whose surfaces are exposed, are used as the display media, so that the child particles are not dissociated under a reverse durability test and primary performance can be maintained during the reverse durability test.

BEST MODE FOR CARRYING OUT THE INVENTION

At first, a basic construction of an information display panel for an image or the like, constituted in an information display device, which uses the particles according to the present invention as the particles having the display media (particles or liquid powders) will be explained. In the information display panel used in the present invention, an electrostatic field is applied to display media sealed between two opposed substrates. Low-charged display media are attracted to the high-charged side and high-charged display media are attracted to the low-charged side along a direction of the applied electrostatic field by means of Coulomb's force, and thus the display media can be moved reciprocally by varying a direction of electrostatic field due to a switching operation of potential. Accordingly, an image can be displayed. Therefore, it is necessary to design the information display panel in such a manner that the display media can move evenly and maintain stability during a reciprocal operation or during a reserving state. Here, as to forces applied to the particles for the display media, there are an attraction force between the particles due to Coulomb' force, an imaging force with respect to the electrodes or substrates, an intermolecular force, a liquid bonding force, a gravity and the like.

One example of the information display panel used in the information display device according to the invention will be explained with reference to FIGS. 1a and 1b-FIGS. 3a and 3b.

In the examples shown in FIGS. 1a and 1b, at least two or more groups of image display media 3 having different colors and charging characteristics and consisting of at least one or more groups of particles (here, a white particle 3W consisting of particles and a black particle 3B consisting of particles are shown) are moved in a perpendicular direction with respect to substrates 1 and 2, in accordance with an electric field applied from electrodes which are arranged outside of the substrates 1 and 2, so as to display a black color by viewing the black particle 3B to an observer or so as to display a white color by viewing the white particle 3W to the observer. In the example shown in FIG. 1b, for example grid-like partition walls 4 is provided between the substrates 1 and 2 to form a display cell, in addition to the example shown in FIG. 1a.

In the examples shown in FIGS. 2a and 2b, at least two or more groups of image display media 3 having different colors and charging characteristics and consisting of at least one or more groups of particles (here, a white particle 3W consisting of particles and a black particle 3B consisting of particles are shown) are moved in a perpendicular direction with respect to substrates 1 and 2, in accordance with an electric field generated by applying a voltage between an electrode 5 provided with the substrate 1 and an electrode 6 provided with the substrate 2, so as to display a black color by viewing the black particle 3B to an observer or so as to display a white color by viewing the white particle 3W to the observer. In the example shown in FIG. 2b, for example grid-like partition walls 4 is provided between the substrates 1 and 2 to form a display cell, in addition to the example shown in FIG. 2a.

The above explanations can be applied to a case such that the white particles 3W consisting of particles are substituted by white liquid powders or a case such that the black particles 3B consisting of particles are substituted by black liquid powders.

Figure 1:
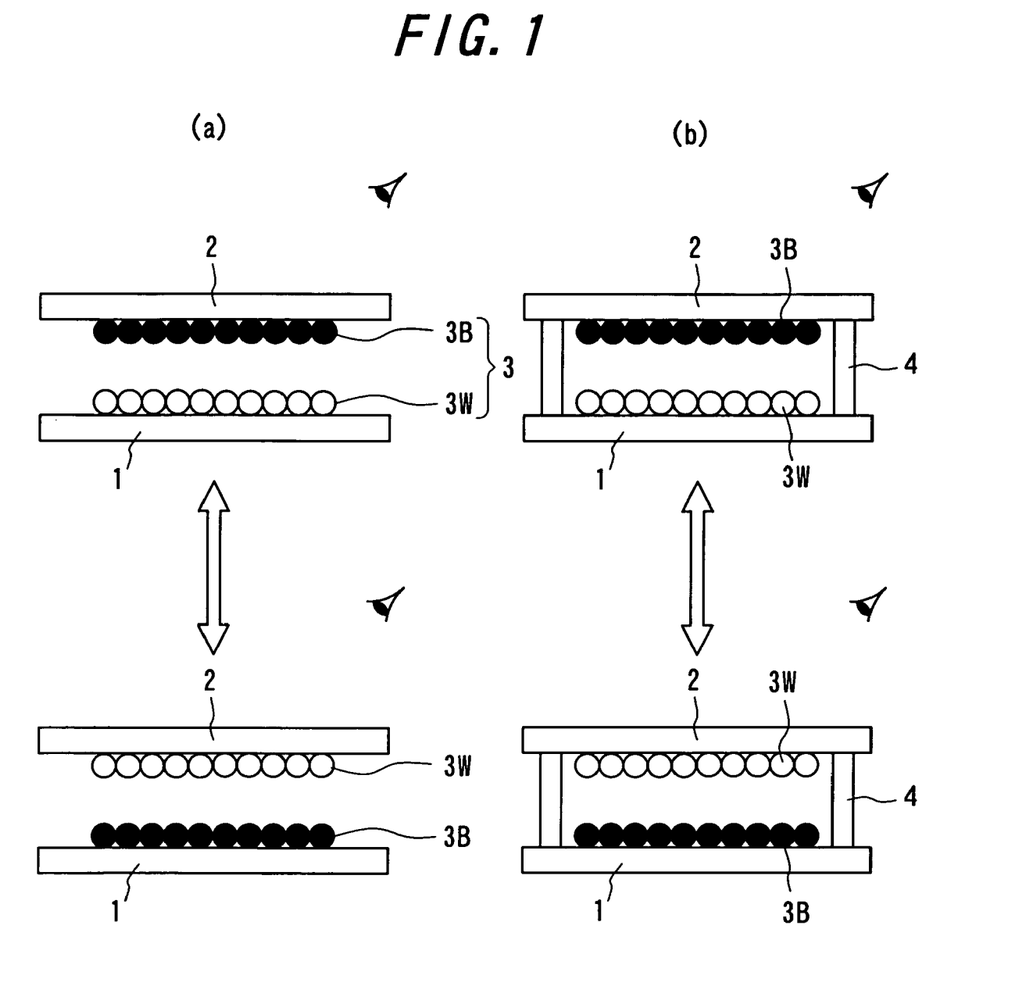
FIGS. 1a and 1b are schematic views respectively showing one example of the information display panel using the particles according to the invention.
Figure 2:
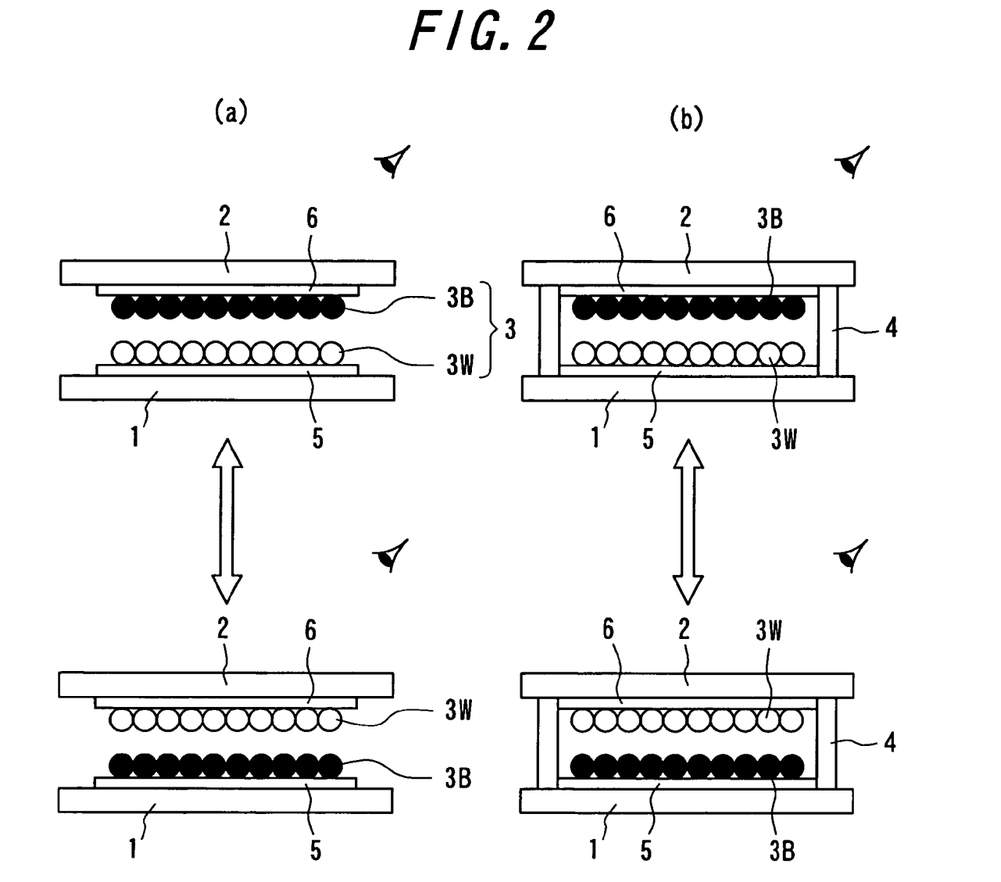
FIGS. 2a and 2b are schematic views respectively illustrating another example of the information display panel using the particles according to the invention.
Figure 3:
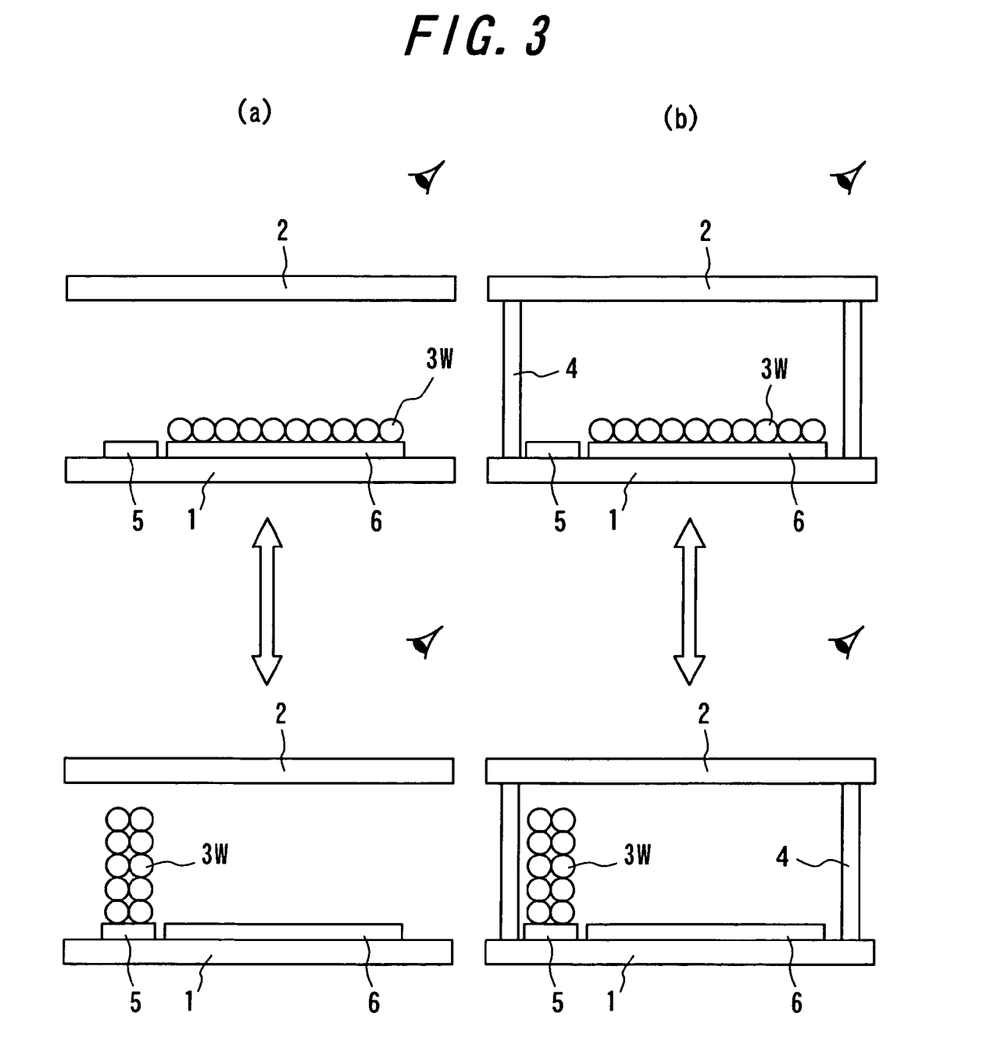
FIGS. 3a and 3b are schematic views respectively depicting still another example of the information display panel using the particles according to the invention.
Figure 4:
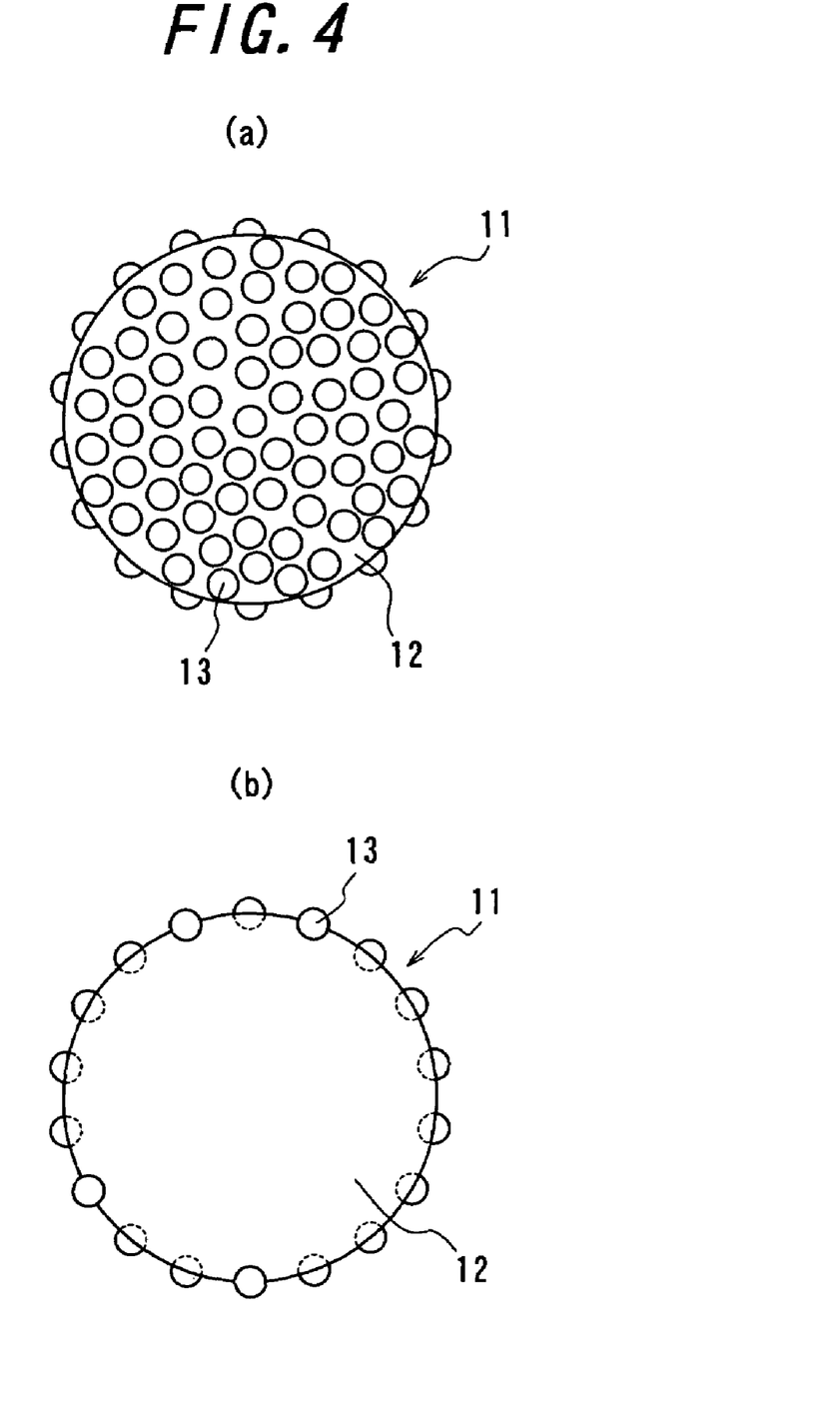
FIGS. 4a and 4b are schematic views respectively showing one example of the particles used for the display media according to the invention.
Figure 5:
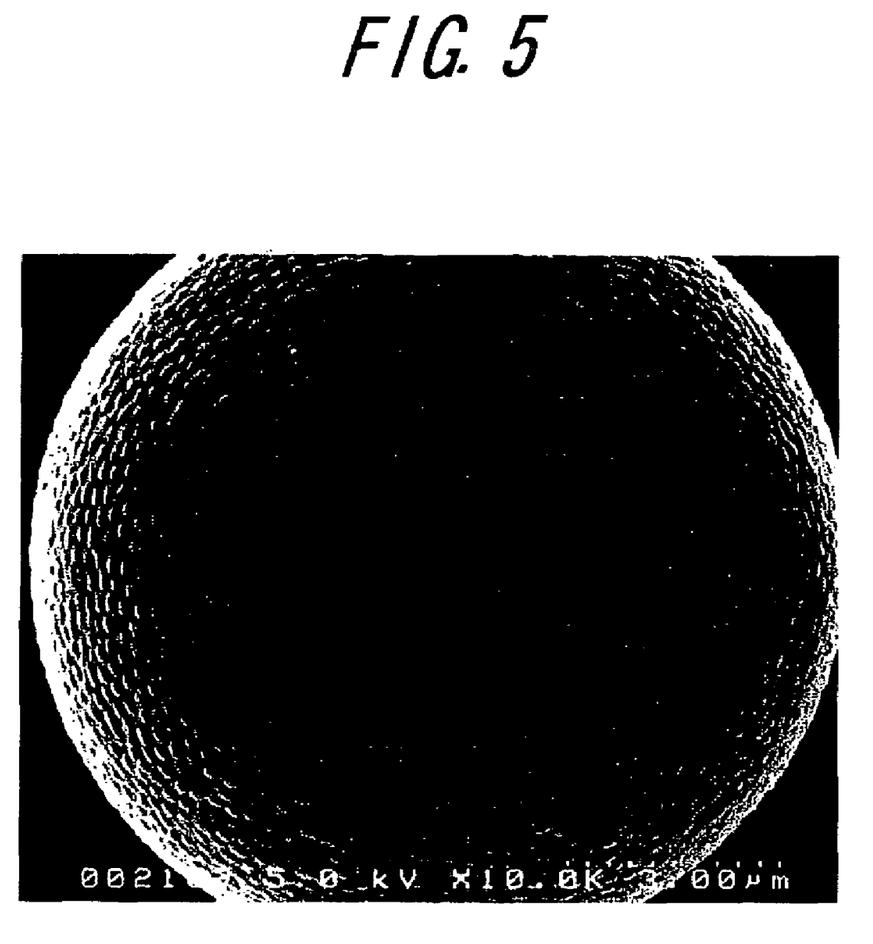
FIG. 5 is a SEM photograph of the particle shown in FIGS. 4a and 4b.

FIGS. 4a and 4b are schematic views respectively showing one example of the particles used for the display media. FIG. 4a is a front view thereof and FIG. 4b is a cross-sectional view thereof. In the examples shown in FIGS. 4a and 4b, a particle 11 used for the display media according to the present invention is characterized in that the particle 11 consists of a compound particle of a mother particle 12 and child particles 13, which are embedded in the surface layer of the mother particle and whose surfaces are exposed. While child particles 13 are singly layered in this example, the number of the layer is not limitative and more than one layer may be applicable. FIG. 5 shows a SEM photograph of the particle for the display media according to the present invention, which is shown in FIGS. 4a and 4b.

The particles for display media according to the present invention are compound particles consisting of mother particles 12 and child particles 13, which are embedded into the surface layer of the mother particles and whose surfaces are exposed, in other word, are compound particles having the constitution/shape of controlling the embedding depth, by which the child particles 13 are embedded in the surface of mother particles 12, so as to prevent dissociation of child particles during a durability test. In this point, when the embedded depth is too small, dissociation of child particles 13 from the surface of a mother particle 12 sometimes happens. On the other hand, when the embedded depth is too large, primary fluidity becomes small and primary reverse performance is sometimes degraded. Therefore, the embedded ratio W, which is defined as follows, preferably ranges from 0.05 to 0.95.

<Definition of Embedded Ratio W>

The average embedded ratio W is defined by the following equation (1) when superficial areas per volume (the superficial area is measured by means of the gas adsorption method or the like) of a compound particle, a mother particle and a child particle are respectively $S$, $S_0$ and $S_1$ ($cm^{-1}$), and each volume compounding quantity of a mother particle and a child particle are respectively $\phi_0$ and $\phi_1$ ($\phi_0+\phi_1=1$).

$$W=1-((S-S_0\phi_0)/\Sigma S_1\phi_1) \quad (1)$$

When n kinds of child particles are used (n>1), the average embedded ratio W is defined by the following equation (2) when superficial areas per volume of each child particles are respectively $S_1, S_2, \ldots, S_n$ (cm$^{-1}$) and each volume compounding quantity are respectively $\phi_1, \phi_2, \ldots, \phi_n$ ($\phi_0 + \Sigma\phi_n = 1$).

$$W = 1 - ((S - S_0\phi_0)/\Sigma S_n\phi_n) \quad (2)$$

An example of the condition when the superficial area is measured by means of a gas adsorption method is shown below. Instrumental technique used: Full automatic gas adsorption measurement device Autosorb-1-C (product of Quantachrome Instrument), control analysis software: AS1WIN (product of Quantachrome Instrument), gas used: $N_2$, absorption temperature: 77K, preliminary process condition: 60° C.×10 hours, measurement sample quantity: 0.2 g, analysis method: BET method.

In the particles for display media according to the present invention, it is preferable that the particle diameter $d_0$ of a mother particle 12 ranges $0.1 < d_0 < 50$ (μm) and the particle diameter $d_{1-n}$ of a child particle ranges $0.01 < d_{1-n} < 1.00$ (μm), with $d_{1-n}/d_0 < 0.33$. When the particle diameter $d_0$ of a mother particle 13 is not more than 0.1 μm, an agglutination force between particles becomes so large and the voltage to drive the display media becomes so high that the particles may not be suitable for display media. On the other hand, when the particle diameter $d_0$ of a mother particle 13 is not less than 50 μm, the image sharpness is deteriorated, the space between the substrates needs to be large and the voltage to drive the display media is too high, so that the particles may not be suitable for display media. In addition, when the particle diameter $d_{1-n}$ is not more than 0.01 μm, the child particles 13 are sometimes embedded into a mother particle 12 during a durability test for display rewriting repetition. When the particle diameter $d_{1-n}$ is not less than 1.00 μm, the initial fluidity of display media is small and primary display rewriting performance is degraded. Furthermore, when $d_{1-n}/d_0$ is not less than 0.33, agglomerates of child particles or agglomerates of mother particles are produced, the fluidity of display media becomes small and display rewriting performance is degraded.

In the particles for display media according to the present invention, a method for embedding child particles 13 into a mother particle 12 in the predetermined state is not limited. However, it is preferable that the method for embedding child particles 13 into a mother particle in a single layer as shown in FIG. 6 or a method for embedding child particles 13 into a mother particle in multilayer as shown in FIG. 7.

Figure 6:
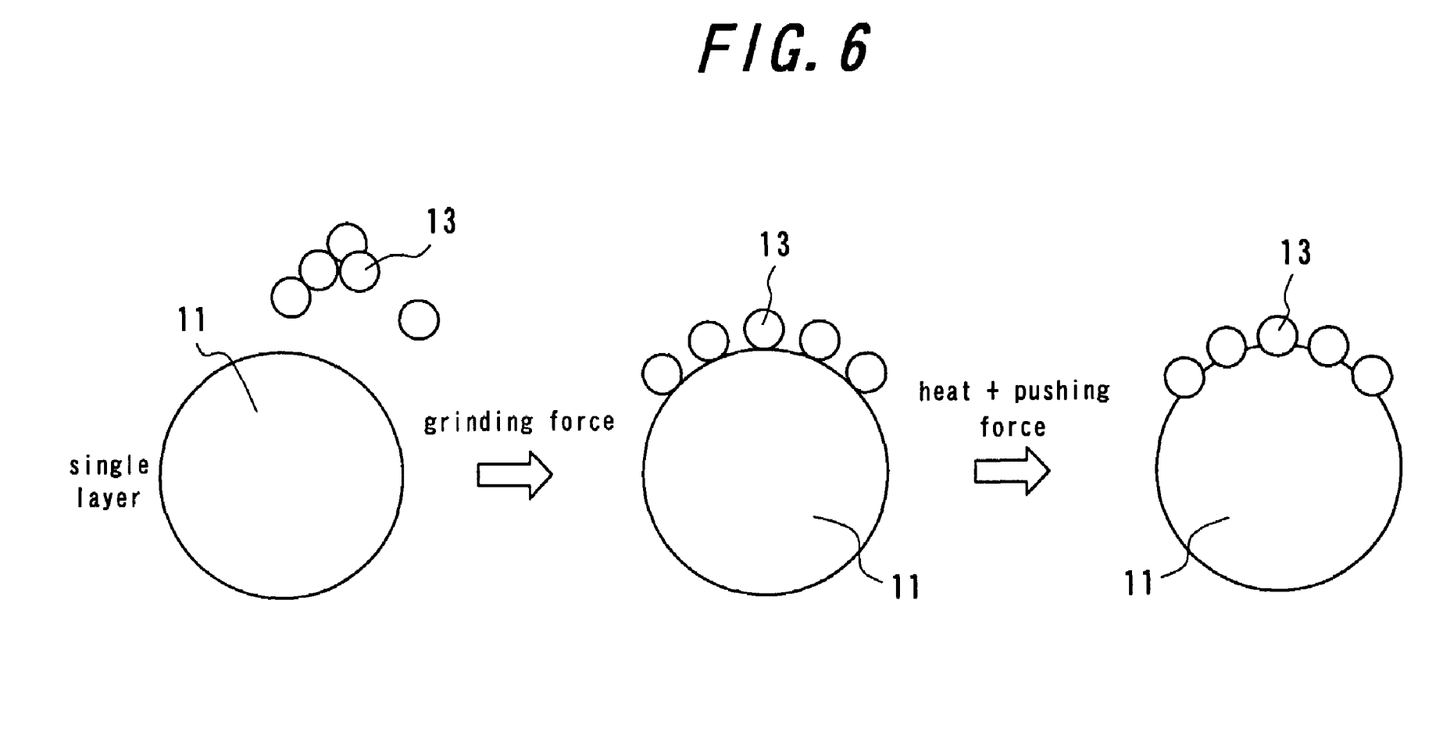
FIG. 6 is a schematic view illustrating an example of a method for embedding child particles into a mother particle in the particle according to the invention.
Figure 7:
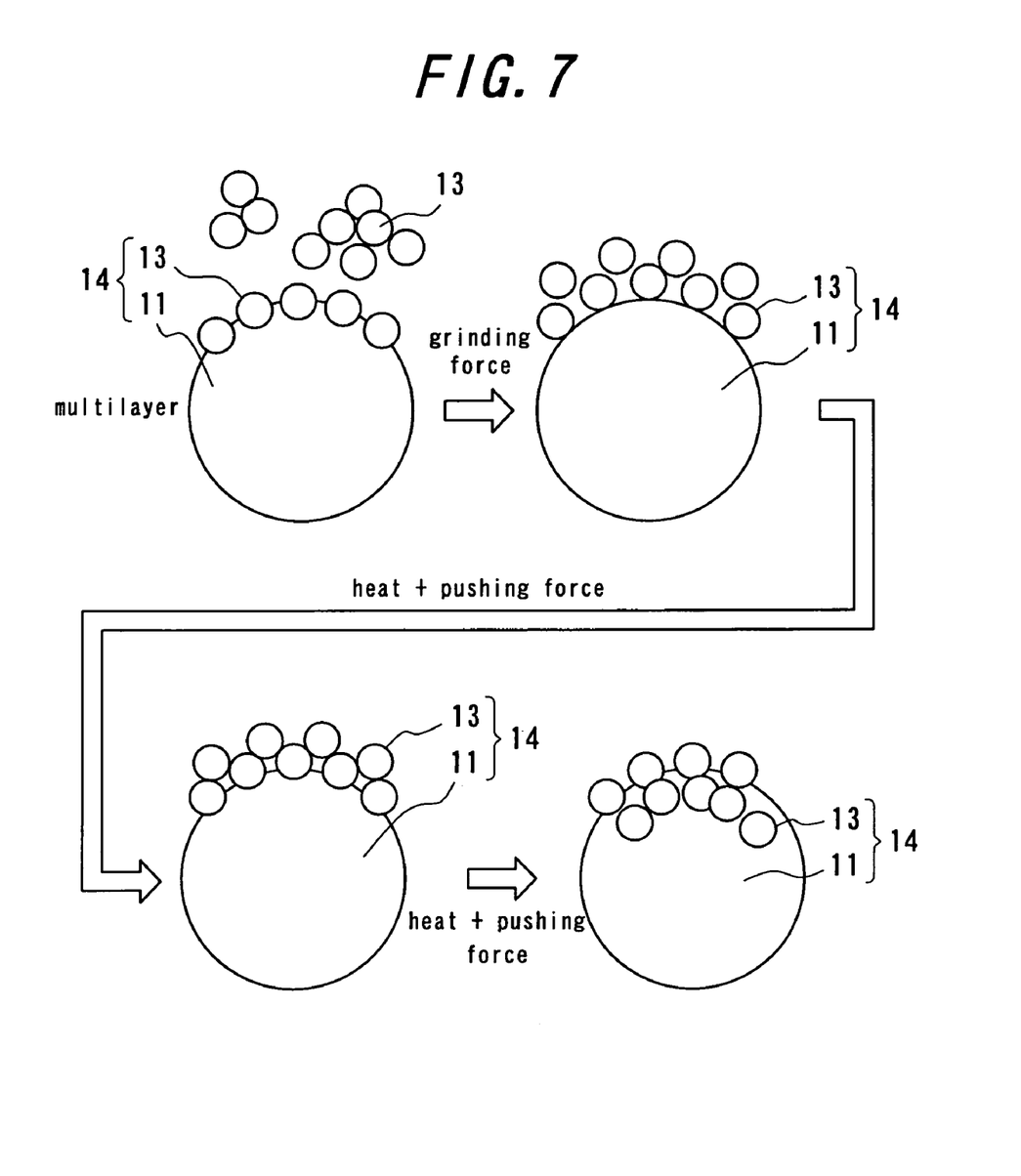
FIG. 7 is a schematic view illustrating another example of a method for embedding child particles into a mother particle in the particle according to the invention.

When child particles 13 are embedded in a single layer as shown in FIG. 6, the prepared mother particle 12 consisting of, for example, thermoplastic resin and child particles 13 are mixed in the predetermined ratio to obtain powder bodies. The obtained powder bodies are mixed by means of a mixer of a henschel type, the child particles 13 are ground and attached to the surface of the mother particle 12 in a single layer, after that, the mother particle 13 is softened by heating, the child particles 13 are pushed into the mother particle 12 by means of centrally-directed acting force, to obtain a compound particle, wherein child particles 13 are embedded in the surface of the mother particle 12. When child particles 13 are embedded in multilayer as shown in FIG. 7, the obtained compound particle by means of the above-mentioned method shown in FIG. 6 is used as another mother particle 14, the mother particle 14 and child particles 13 are mixed in the predetermined ratio to obtain powder bodies. The obtained powder bodies are mixed by means of a mixer of a henschel type, the child particles 13 are ground and attached to the surface of the mother particle 14 in one layer or more, after that, the mother particle 14 is softened by heating, the child particles 13 are pushed into the mother particle 14 by means of centrally-directed acting force, to obtain a compound particle, wherein child particles 13 are embedded in the surface of the mother particle 14.

Hereinafter, respective members of the information display panel according to the invention will be explained in detail.

As for the substrate, at least one of the substrates is the transparent substrate 2 through which a color of the particles can be observed from outside of the display panel, and it is preferred to use a material having a high transmission factor of visible light and an excellent heat resistance. The substrate 1 may be transparent or opaque. Examples of the substrate material include polymer sheets such as polyethylene terephthalate, polyether sulfone, polyethylene, polycarbonate, polyimide or acryl and metal sheets having flexibility and inorganic sheets such as glass, quartz or the like having no flexibility. The thickness of the substrate is preferably 2 to 5000 μm, more preferably 5 to 2000 μm. When the thickness is too thin, it becomes difficult to maintain strength and distance uniformity between the substrates, and when the thickness is thicker than 5000 μm, it is inconvenient for the thin information display panel.

As for the electrodes provided if necessary, the electrode 6, which should be transparent since it is disposed at an observation side and is arranged to a side of the substrate 2, is formed of electro-conductive materials, which are transparent and capable of pattern formation. As such electro-conductive materials, metals such as aluminum, gold, silver, copper and so on, and conductive polymers such as ITO, indium oxide, zinc oxide, polyaniline, polypyrrole, polythiophene and so on are listed. There are formation methods, for example, vacuum vapor deposition method, coating method, and so on. Additionally, the thickness of the electrode is preferable to be 3 to 1000 nm, more preferable to be 5 to 400 nm so that the electro-conductivity and optical transparency can be maintained. The material and the thickness of the electrode 5 arranged to a side of the substrate 1 are the same as those of the electrode 6, but transparency is not necessary. In this case, the applied outer voltage may be superimposed with a direct current or an alternate current.

As for the partition wall 4 provided if necessary, a shape of the partition wall is suitably designed in accordance with a kind of the display media used for the display and is not restricted. However, it is preferred to set a width of the partition wall to 2-100 μm more preferably 3-50 μm and to set a height of the partition wall to 10-500 μm more preferably 10-200 μm. Moreover, there are a double rib method and single rib method as a method of forming the partition wall. In the double rib method ribs are formed on the opposed substrates respectively and then connected with each other. In the single rib method a rib is formed on one of the opposed substrates only. Both methods mentioned above may be preferably applied to the present invention.

Figure 8:
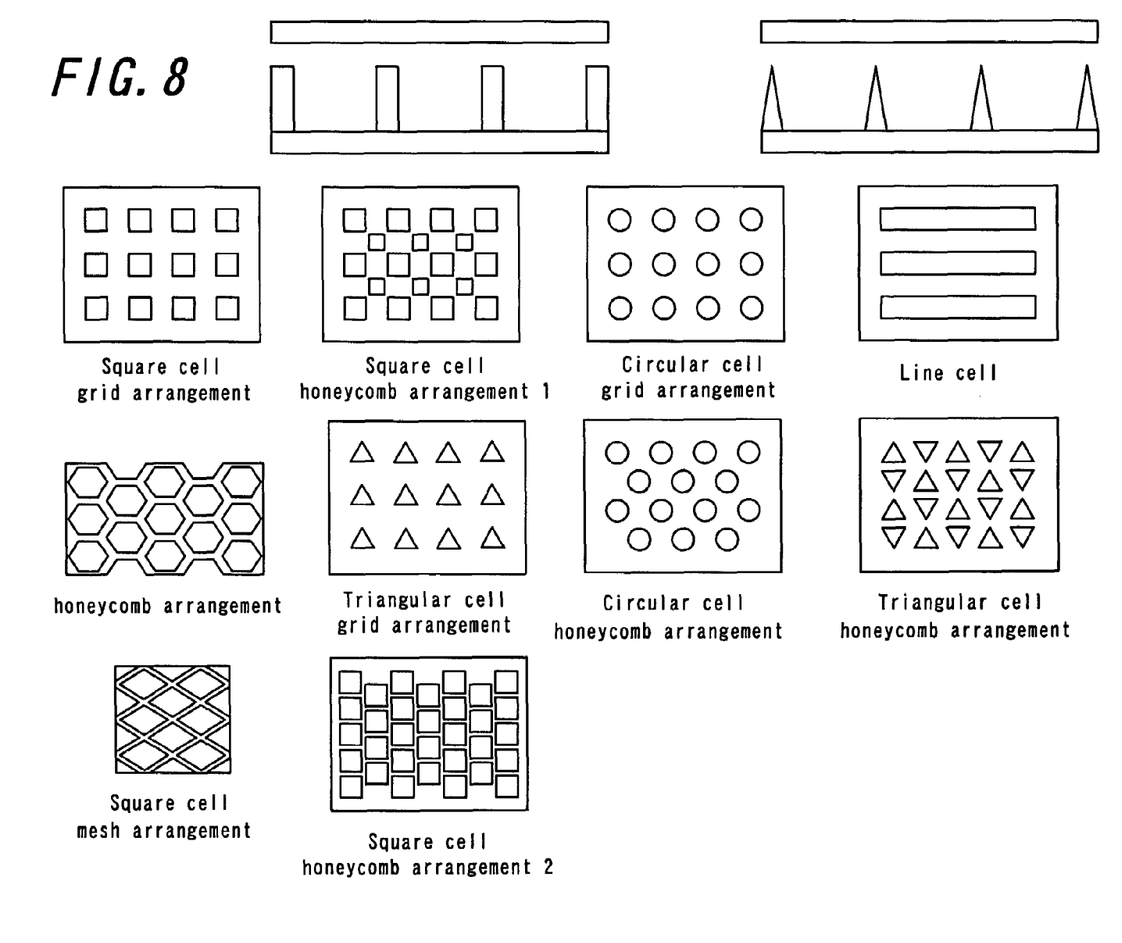
FIG. 8 is a schematic view showing one example of a shape of the partition walls in the information display panel according to the invention.

The cell formed by the partition walls each made of rib has a square shape, a triangular shape, a line shape, a circular shape and a hexagon shape, and has an arrangement such as a grid, a honeycomb and a mesh, as shown in FIG. 8 viewed from a plane surface of the substrate. It is preferred that the portion corresponding to a cross section of the partition wall observed from the display side (an area of the frame portion of the display cell) should be made as small as possible, so that sharpness of the image display can be improved. As the formation method of the partition wall there are a screen-printing method, a sandblast method, a photolithography method, an additive method and a die transferring method. Among them, it is preferred to use a photolithography method using a resist film and a die transferring method.

Next, the particles used for the display media according to the invention will be explained. The particles including both mother and child particles, which are mainly formed by resin can contain charge control agent, coloring agent, inorganic additive and the like. Hereinafter, resin, contain charge control agent, coloring agent, other additive will be listed.

Typical examples of the resin include urethane resin, urea resin, acrylic resin, polyester resin, acryl urethane resin, acryl urethane silicone resin, acryl -urethane fluorocarbon polymers, acryl fluorocarbon polymers, silicone resin, acryl silicone resin, epoxy resin, polystyrene resin, styrene acrylic resin, polyolefin resin, butyral resin, vinylidene chloride resin, melamine resin, phenolic resin, fluorocarbon polymers, polycarbonate resin, polysulfon resin, polyether resin, and polyamide resin. Two kinds or more of these may be mixed and used. For the purpose of controlling the adherence to the substrate, acryl urethane resin, acryl silicone resin, acryl fluorocarbon polymers, acryl urethane silicone resin, acryl urethane fluorocarbon polymers, fluorocarbon polymers, silicone resin are particularly preferable.

Though charge control agents are not particularly specified to the following examples, examples of the negative charge control agent include salicylic acid metal complex, metal containing azo dye, oil-soluble dye of metal-containing (containing a metal ion or a metal atom), the fourth grade ammonium salt-based compound, calixarene compound, boron-containing compound (benzyl acid boron complex), and nitroimidazole derivative. Examples of the positive charge control agent include nigrosine dye, triphenylmethane compound, the fourth grade ammonium salt-based compound, polyamine resin, imidazole derivatives. Additionally, metal oxides such as ultra-fine particles of silica, ultra-fine particles of titanium oxide, ultra-fine particles of alumina, and so on; nitrogen-containing circular compound such as pyridine, and so on, and these derivates or salts; and resins containing various organic pigments, fluorine, chlorine, nitrogen and the like can be employed as the charge control agent.

As for a coloring agent, various kinds of organic or inorganic pigments or dye with various colors as described below are usable.

Examples of black pigments include carbon black, copper oxide, manganese dioxide, aniline black, activate carbon and the like.

Examples of blue pigments include C.I. pigment blue 15:3, C.I. pigment blue 15, Berlin blue, cobalt blue, alkali blue lake, Victoria blue lake, phthalocyanine blue, metal-free phthalocyanine blue, partially chlorinated phthalocyanine blue, first sky blue, Indunsren blue BC and the like.

Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, brilliant carmine 3B, C.I. pigment red 2 and the like.

Examples of yellow pigments include chrome yellow, zinc chromate, cadmium yellow, yellow iron oxide, mineral first yellow, nickel titanium yellow, navel orange yellow, naphthol yellow S, hansa yellow G, hansa yellow 10G, benzidine yellow G, benzidine yellow GR, quinoline yellow lake, permanent yellow NCG, tartrazinelake, C.I. pigment yellow 12 and the like. Examples of green pigments include chrome green, chromium oxide, pigment green B, C.I. pigment green 7, Malachite green lake, final yellow green G and the like.

Examples of orange pigments include red chrome yellow, molybdenum orange, permanent orange GTR, pyrazolone orange, Balkan orange, indunsren brilliant orange RK, benzidine orange G, Indusren brilliant orange GK, C.I. pigment orange 31 and the like.

Examples of purple pigments include manganese purple, first violet B, methyl violet lake and the like.

Examples of white pigments include zinc oxide, titanium oxide, antimony white, zinc sulphide and the like.

Examples of extenders include baryta powder, barium carbonate, clay, silica, white carbon, talc, alumina white and the like. Furthermore, there are Nigrosine, Methylene Blue, rose bengal, quinoline yellow, and ultramarine blue as various dyes such as basic dye, acidic dye, dispersion dye, direct dye, etc.

Examples of inorganic additives include titanium oxide, zinc oxide, zinc sulphide, antimony oxide, calcium carbonate, pearl white, talc, silica, calcium silicate, alumina white, cadmium yellow, cadmium red, cadmium orange, titanium yellow, Berlin blue, Armenian blue, cobalt blue, cobalt green, cobalt violet, ion oxide, carbon black, manganese ferrite black, cobalt ferrite black, copper powder, aluminum powder and the like.

Inorganic additives among these coloring agents may be used alone or in combination with two or more kinds thereof. Particularly, carbon black is preferable as the black coloring agent, and titanium oxide is preferable as the white coloring agent.

Moreover, it is preferable to use particles according to the present invention, whose average particle diameter d(0.5) ranges between 0.1 to 20 μm and which are even. If the average particle diameter d(0.5) exceeds this range, the image sharpness is sometimes deteriorated, and, if the average particle diameter is smaller than this range, an agglutination force between the particles becomes too large to prevent the movement of the particles.

Further, in the present invention as for the particle diameter distribution, the particle diameter distribution Span, which is defined by the following formula, is less than 5 preferably less than 3:

$$\mathrm{Span} = (d(0.9) - d(0.1))/d(0.5)$$

(here, d(0.5) means a value of the particle diameter expressed by μm wherein an amount of the particles having the particle size larger than or smaller than this value is 50%, d(0.1) means a value of the particle diameter expressed by μm wherein an amount of the particles having the particle size smaller than this value is 10%, and d(0.9) means a value of the particle size expressed by μm wherein an amount of the particles having the particle size smaller than this value is 90%).

When the Span is set to no more than 5, each particle has similar particle diameter to perform an even particle movement.

Furthermore, as for a correlation between each particles, it is crucial to set a ratio of d(0.5) of the particles having smallest diameter with respect to d(0.5) of the particles having largest diameter to not more than 50 preferably not more than 10. Even if the particle diameter distribution Span is made smaller, the particles having different charge properties with each other are moved in the opposite direction. Therefore, it is preferred that the particle diameters are formed closely with each other and equivalent amounts of the particles are easily moved in the opposite direction. To this end, the above range is obtained.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution.

In the present invention, the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

A charge amount of the display media properly depends upon the measuring condition. However, it has been found that the charge amount of the display media in the information display panel substantially depends upon an initial charge amount, a contact with respect to the partition walls, a contact with respect to the substrates, a charge decay due to an elapsed time, and specifically a saturation value of the particles for the display media during a charge behavior is a main factor.

After various investigations by the inventors, it is found that an adequate range of the charged values of the particles for the display media can be estimated by performing a blow-off method utilizing the same carrier particles so as to measure the charge amount of the particles for the display media.

Then, the liquid powders used as the display as an example will be explained. The applicant has the right of the name of the liquid powders utilized in the present invention as "electric liquid powders (trade mark)".

In the present invention, a term "liquid powders" means an intermediate material having both of liquid properties and particle properties and exhibiting a self-fluidity without utilizing gas force and liquid force. For example, a liquid crystal is defined as an intermediate phase between a liquid and a solid, and has a fluidity showing a liquid characteristic and an anisotropy (optical property) showing a solid characteristic (Heibonsha Ltd.: encyclopedia). On the other hand, a definition of the particle is a material having a finite mass even if it is vanishingly small and receives an attraction of gravity (Maruzen Co., Ltd.: physics subject-book). Here, even in the particles, there are special states such as gas-solid fluidized body and liquid-solid fluidized body. If a gas is flown from a bottom plate to the particles, an upper force is acted with respect to the particles in response to a gas speed. In this case, the gas-solid fluidized body means a state that is easily fluidized when the upper force is balanced with the gravity. In the same manner, the liquid-solid fluidized body means a state that is fluidized by a liquid. (Heibonsha Ltd.: encyclopedia) In the present invention, it is found that the intermediate material having both of fluid properties and solid properties and exhibiting a self-fluidity without utilizing gas force and liquid force can be produced specifically, and this is defined as the liquid powders.

That is, as is the same as the definition of the liquid crystal (intermediate phase between a liquid and a solid), the liquid powder according to the invention is a material showing the intermediate state having both of liquid properties and particle properties, which is extremely difficult to receive an influence of the gravity showing the particle properties mentioned above and indicates a high fluidity. Such a material can be obtained in an aerosol state i.e. in a dispersion system wherein a solid-like or a liquid-like material is floating in a relatively stable manner as a dispersant in a gas, and thus, in the information display panel according to the invention, a solid material is used as a dispersant.

In the information display panel which is a target of the present invention, the liquid powders composed of a solid material stably floating as a dispersant in a gas and exhibiting a high fluidity in an aerosol state are sealed between two opposed substrates, at least one substrate being transparent. Such liquid powders can be made to move easily and stably by means of Coulomb's force and so on generated by applying a low voltage.

As mentioned above, the liquid powders according to the present invention means an intermediate material having both of liquid properties and particle properties and exhibiting a self-fluidity without utilizing gas force and liquid force. Such liquid powders become particularly an aerosol state. In the information display panel according to the invention, the liquid powders are used in a state such that a solid material is relatively stably floating as a dispersant in a gas.

As the aerosol state, it is preferred that an apparent volume in a maximum floating state is two times or more, more preferably 2.5 times or more, and most preferably three times or more than that in none floating state. In this case, an upper limit is not defined, but it is preferred that an apparent volume is 12 times or less than that in none floating state.

If the apparent volume in the maximum floating state is less than two times than that in none floating state, a display controlling may become difficult. On the other hand, if the apparent volume in the maximum floating state is more than 12 times, a handling inconvenience during a liquid powders filling operation into the device such as a particle over-scattering may occur. The apparent volume in the maximum floating state is measured as follows. That is, it is measured by filling the liquid powders in a transparent closed vessel through which the liquid powders are seen; vibrating or dropping the vessel itself to obtain a maximum floating state; and measuring an apparent volume at that time from outside of the vessel. Specifically, the liquid powders having a volume ⅓ of the vessel in none floating state are filled in a vessel having a diameter (inner diameter) of 6.cm and a height of 10 cm with a polypropylene cap (product name I-boy produced by As-one Co., Ltd.), the vessel is set in the vibrator, and a vibration wherein a distance of 6 cm is repeated at a speed of 3 reciprocating/sec. is performed for 3 hours. Then, the apparent volume in the maximum floating state is obtained from an apparent volume just after a vibration stop.

Moreover, in the information display panel according to the invention, it is preferred that a time change of the apparent volume of the liquid powders satisfies the following formula:

$$V_{10}/V_5 > 0.8;$$

here, $V_5$ indicates the apparent volume ($cm^3$) of the liquid powders after 5 minutes from the maximum floating state; and $V_{10}$ indicates the apparent volume ($cm^3$) of the liquid powders after 10 minutes from the maximum floating state. In this case, in the information display device according to the invention, it is preferred that the time change $V_{10}/V_5$ of the apparent volume of the liquid powders is larger than 0.85, more preferably larger than 0.9. If the time change $V_{10}/V_5$ is not larger than 0.8, the liquid powders are substantially equal to normal particles, and thus it is not possible to maintain a fast response and durability for the rewriting repetition according to the invention. Moreover, the average particle diameter d(0.5) of the particle materials constituting the liquid powders is preferably 0.1-20 µm, more preferably 0.5-µm, most preferably 0.9-8 µm. If the average particle diameter d(0.5) is less than 0.1 µm, a display controlling may become difficult. On the other hand, if the average particle diameter d(0.5) is larger than 20 µm, sharpness of the image display may be degraded. The average particle diameter d(0.5) of the particle materials constituting the liquid powders is equal to d(0.5) in the following particle diameter distribution Span.

The particle diameter distribution Span of the particle material constituting the liquid powders, which is defined by the following formula, is preferably less than 5, more preferably less than 3:

Particle diameter distribution Span=$(d(0.9)-d(0.1))/d(0.5)$ here, d(0.5) means a value of the particle diameter expressed by μm wherein an amount of the particle material constituting the liquid powders having the particle diameter larger than this value is 50% and an amount of the particle material constituting the liquid powders having the particle diameter expressed by μm wherein an amount of the particle material constituting the liquid powders having a particle diameter smaller than this value is 10%, and d(0.9) means a value of the particle diameter expressed by μm wherein an amount of the particle material constituting the liquid powders having the particle diameter smaller than this value is 90%.

When the particle diameter distribution Span of the particle materials constituting the liquid powders is set to no more than 5, each liquid particle has similar particle diameter to perform an even liquid particle movement. Here, the particle diameter distribution and the particle diameter mentioned above can be measured by means of a laser diffraction/scattering method. When a laser light is incident upon the liquid particles to be measured, a light intensity distribution pattern due to a diffraction/scattering light occurs spatially. This light intensity distribution pattern corresponds to the particle diameter, and thus it is possible to measure the particle diameter and the particle diameter distribution. The particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

The liquid powders may be formed by mixing/grinding necessary resin, charge control agent, coloring agent, other additives, by polymerizing from monomer or by coating a known particle with resin, charge control agent, coloring agent, and other additives. Hereinafter, typical examples of resin, charge control agent, coloring agent, other additives constituting the liquid powders will be explained.

Examples of the resin include urethane resin, acrylic resin, polyester resin, acrylic urethane resin, silicone resin, nylon resin, epoxy resin, styrene resin, butyral resin, vinylidene chloride resin, melamine resin, phenolic resin, fluorocarbon polymers and the like. It is also possible to combine two or more resins. For the purpose of controlling the adherence to the substrate, acryl urethane resin, acryl urethane silicone resin, acryl urethane fluorocarbon polymers, urethane resin and fluorocarbon polymers are preferred.

Examples of the charge control agent include positive charge control agents such as the fourth grade ammonium salt compound, nigrosine dye, triphenylmethane compound, imidazole derivatives, and so on, and negative charge control agents such as metal containing azo dye, salicylic acid metal complex, nitroimidazole derivative and so on.

As for a coloring agent, various kinds of organic or inorganic pigments or dye with various colors as described below are usable.

Examples of black pigments include carbon black, copper oxide, manganese dioxide, aniline black, activate carbon and the like. Examples of blue pigments include C.I. pigment blue 15:3, C.I. pigment blue 15, Berlin blue, cobalt blue, alkali blue lake, Victoria blue lake, phthalocyanine blue, metal-free phthalocyanine blue, partially chlorinated phthalocyanine blue, first sky blue, Indunsren blue BC and the like.

Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, brilliant carmine 3B, C.I. pigment red 2 and the like.

Examples of yellow pigments include chrome yellow, zinc chromate, cadmium yellow, yellow iron oxide, mineral first yellow, nickel titanium yellow, navel orange yellow, naphthol yellow S, hansa yellow G, hansa yellow 10G, benzidine yellow G, benzidine yellow GR, quinoline yellow lake, permanent yellow NCG, tartrazinelake, C.I. pigment yellow 12 and the like. Examples of green pigments include chrome green, chromium oxide, pigment green B, C.I. pigment green 7, Malachite green lake, final yellow green G and the like.

Examples of orange pigments include red chrome yellow, molybdenum orange, permanent orange GTR, pyrazolone orange, Balkan orange, indunsren brilliant orange RK, benzidine orange G, Indusren brilliant orange GK, C.I. pigment orange 31 and the like.

Examples of purple pigments include manganese purple, first violet B, methyl violet lake and the like.

Examples of white pigments include zinc oxide, titanium oxide, antimony white, zinc sulphide and the like.

Examples of extenders include baryta powder, barium carbonate, clay, silica, white carbon, talc, alumina white and the like. Furthermore, there are Nigrosine, Methylene Blue, rose bengal, quinoline yellow, and ultramarine blue as various dyes such as basic dye, acidic dye, dispersion dye, direct dye, etc.

Examples of inorganic additives include titanium oxide, zinc oxide, zinc sulphide, antimony oxide, calcium carbonate, pearl white, talc, silica, calcium silicate, alumina white, cadmium yellow, cadmium red, cadmium orange, titanium yellow, Berlin blue, Armenian blue, cobalt blue, cobalt green, cobalt violet, ion oxide, carbon black, manganese ferrite black, cobalt ferrite black, copper powder, aluminum powder and the like.

Inorganic additives among these coloring agents may be used alone or in combination with two or more kinds thereof. Particularly, carbon black is preferable as the black coloring agent, and titanium oxide is preferable as the white coloring agent.

Further, in the present invention, it is important to control a gas surrounding the display media in a gap between the substrates, and a suitable gas control contributes an improvement of display stability. Specifically, it is important to set the relative humidity of the gas in the gap not more than 60% RH at 25° C., preferably not more than 50% RH, more preferably not more than 35% RH.

The above gap means a gas portion surrounding the display media obtained by substituting occupied portions of the electrodes 5, 6, the display media (particles or liquid powders) 3 and the partition walls 4 (in the case of arranging the partition wall) and a seal portion of the information display panel from the space between the opposed substrates 1 and 2 shown in FIGS. 1*a* and 1*b*.

A kind of the gap gas is not limited as long as it has the humidity mentioned above, but it is preferred to use dry air, dry nitrogen gas, dry argon gas, dry helium gas, dry carbon dioxide gas, dry methane gas and so on. It is necessary to seal this gas in the information display panel so as to maintain the humidity mentioned above. For example, it is important to perform the operations of filling the display media and assembling the information display panel under an atmosphere having a predetermined humidity and to apply a seal member and a seal method for preventing a humidity inclusion from outside. In the information display panel provided with the information display device according to the invention, an gap between the substrates may be adjusted so that the display media can be moved to maintain the contrast. The gap is adjusted normally to 10-500 µm, preferably 10-200 µm.

The volume occupied rate of the display media in a space between the opposed substrates is preferably 5-70%, more preferably 5-60% If the volume occupied rate of the display media exceeds 70%, the display media may become difficult to move, and if it is less than 5%, a sufficient contrast cannot be obtained and a sharp image display is not performed.

EMBODIMENTS

Hereinafter, examples and comparative examples are shown so as to explain the present invention further specifically. However, the present invention is not limited to the following examples and comparative examples.

First, as shown in Table 1, black particles and white particles were prepared, which consisted of a compound particle having one kind of child particle embedded into one kind of mother particle or only a mother particle not having embedded child particles. The base resin and the pigments, whose compounding ratio is shown in following Table 1, were mixed with a mixer having two axes, and finely ground with a jet mill to produce a mother particle. In the case that the particles consisted of only mother particles, the obtained particles were made to be black particles and white particles. At the same time, in the case that the particles consisted of compound particles of mother particles and child particles, the mother particles and child particles were mixed, whose compounding ratio is shown in Table 1, supplied into a carbon mixer HFM-001C (product of SMT Co., Ltd.), and processed under the condition of 50 degree C., 4000 rpm for 120 minutes so that the child particles were embedded in the surfaces of the mother particles to obtain the compound particles. The obtained compound particles were made to pass a SUS sieve with 150 µm opening to provide black particles and white particles. In Table 1, toraycon 1401x31 (product of TORAY Co., Ltd) as PBT resin was used. UBE nylon 1011FB (product of UBE INDUSTRIES, Ltd.) as PA resin was used. E-640 (product of Toyo Syrol Co., Ltd.) as HIPS resin was used. Special Black 4(product of Degussa Co., Ltd.) as C/B was used. TIPEQUE CE-50 (product of ISHIHARA SANGYO KAISYA, Ltd.) as $TiO_2$ was used. Seahoster KE-P10 (product of Nippon Shokubai Co., Ltd.) as silica fine particle was used. Eposter S (product of Nippon Shokubai Co., Ltd.) as melamine fine particle was used. Chemisnow MP300 (product of Soken Chemical & Engineering Co., Ltd.) as PMMA resin fine particle was used. The particle diameter $d_0$ of a mother particle consisting of a black particle and a white particle, and the particle diameter $d_1$ of a child particle, when they were used, were measured. When child particles were used, the average embedded rate W was calculated from the superficial area, which was obtained by the above-mentioned superficial area measurement method. In the examples, a kind of child particles was embedded into one kind of mother particle. The particle diameter of the mother particle (white or black) is $d_0$ and the particle diameter of the child particle (white or black) is $d_1$.

The prepared black and white particles were used to produce an information display panel for the information display device according to the above-mentioned method. The initial image display contrast and the image display contrast after one million times rewriting as the evaluation for the display function were measured. Based on the evaluation result, judgment of good or bad relating to the repeated rewriting durability was made. The voltage of 250V was applied to the information display panel, reversing the potentials and repeating the display of black and white to evaluate the display function. Both of the initial image display contrast and the image display contrast after one million times rewriting were measured. The reflection density in the black and white displays was measured by means of a reflection image densitometer and the contrast was obtained by dividing the reflection density in the black display by the reflection density in the white display. The result is shown in the following Table 1.

TABLE 1

|  |  | Example 1 | | Example 2 | | Example 3 | | Comparative Example 1 | |
| --- | --- | --- | --- | --- | --- | --- | --- | --- | --- |
|  |  | black particle | white particle | black particle | white particle | black particle | white particle | black particle | white particle |
| mother particle | base resin | PBT | HIPS | PA | HIPS | PA | HIPS | PBT | HIPS |
|  | base resin compounding ratio (wt %) | 95 | 50 | 95 | 50 | 95 | 50 | 95 | 50 |
|  | C/B (black pigment) compounding ratio (wt %) | 5 |  | 5 |  | 5 |  | 5 |  |
|  | $TiO_2$ (white pigment) compounding ratio (wt %) |  | 50 |  | 50 |  | 50 |  | 50 |
| child particle |  | melamine resin fine particle | silica fine particle | melamine resin fine particle | — | PMMA resin fine particle | — | — | — |
| mother particle compounding quantity $\phi_0$ |  | 0.94 | 0.97 | 0.95 | 1.00 | 0.92 | 1.00 | 1.00 | 1.00 |
| child particle compounding quantity $\phi_1$ (process quantity) |  | 0.06 | 0.03 | 0.05 | 0.00 | 0.08 | 0.00 | 0.00 | 0.00 |
| mother particle diameter $d_0$ (µm) |  | 10.2 | 9.3 | 9.7 | 9.3 | 9.7 | 9.3 | 10.2 | 9.3 |
| child particle diameter $d_1$ (µm) |  | 0.24 | 0.11 | 0.24 | — | 0.10 | — | — | — |
| $d_1/d_0$ |  | 0.024 | 0.012 | 0.025 | — | 0.010 | — | — | — |
| average embedded ratio W |  | 0.81 | 0.75 | 0.66 | — | 0.19 | — | — | — |
| initial contrast |  | 11.8 | | 10.9 | | 12.1 | | 11.6 | |
| contrast after one million times rewriting |  | 11.6 | | 11.1 | | 10.2 | | 1.5 | |
| judgment in durability |  | OK | | OK | | OK | | NG | |

From the result of Table 1, in the examples 1 to 3, wherein the child particles consisting of both or either of the black and white particle groups for display media were embedded into the mother particles to produce compound particles, the durability test of display rewriting repetition was found to show better result, in comparison with the comparative example, wherein no compound particles were used in the black and white particle groups for display media.

INDUSTRIALLY APPLICABILITY

The information display device having the information display panel according to the invention is preferably applicable to the display unit for mobile equipment such as notebook personal computers, PDAs, cellular phones, handy terminals and so on; to the electric paper such as electric books, electric newspapers and so on; to the bulletin boards such as signboards, posters, blackboards and so on; to the image display unit for electric calculator, home electric application products, auto supplies and so on; to the card display unit such as point cards, IC cards and so on; and to the display unit for electric advertisements, electric POPs, electric bin tags, electric price tags, electric musical score, RF-ID device and so on.

The invention claimed is:

1. Particles for display media used for an information display device, wherein the display media are sealed between two opposed substrates, at least one of which is transparent and wherein the display media, to which an electrostatic field is applied, are made to move so as to display information such as an image or the like, comprising compound particles of mother particles and child particles, which are embedded in the surface layer of the mother particles and whose surfaces are exposed;

wherein a particle diameter of a mother particle $d_0$ and a particle diameter of a child particle $d_{1-n}$ are provided with $0.01 < d_0 < 50$ (μm), $0.01 < d_{1-n} < 1.00$ (μm) and $d_{1-n}/d_0 < 0.33$ respectively, and average embedding rate W defined below is provided with $0.05 < W < 0.95$;

$$W = 1 - ((S - S_0 \phi_0)/\Sigma S_n \phi_n),$$

wherein S is superficial area of a compound particle per unit volume, $S_0$ is superficial area of a mother particle per unit volume, and $S_n$ is superficial area of a child particle per unit volume.

2. The particles for display media according to claim 1, wherein display media are particles.

3. The particles for display media according to claim 1, wherein display media are liquid powders.

4. An information display panel characterized in that the improvement uses the particles for display media set forth in claim 1.

5. An information display device characterized in that the improvement has the information display panel set forth in claim 4.

* * * * *